United States Patent [19]
Covington et al.

[11] Patent Number: 4,993,216
[45] Date of Patent: Feb. 19, 1991

[54] COTTON HARVESTER MOUNTING AND SUPPORTING SYSTEM WITH HIGH LIFT CAPACITY

[75] Inventors: Michael J. Covington, LaGrange; G. Neil Thedford, Naperville; Jesse H. Orsborn, Hinsdale, all of Ill.

[73] Assignee: J. I. Case Company, Racine, Wis.

[21] Appl. No.: 445,455

[22] Filed: Dec. 4, 1989

[51] Int. Cl.[5] ............................................. A01D 46/08
[52] U.S. Cl. ........................................ 56/15.9; 56/28; 56/DIG. 10; 56/DIG. 14
[58] Field of Search ............... 56/15.9, 14.9, 15.6, 56/28, 30, 36, 15.5, DIG. 3, DIG. 9, DIG. 10, DIG. 14

[56] References Cited

U.S. PATENT DOCUMENTS

| Re. 32,699 | 6/1988 | Fachini | 56/44 |
|---|---|---|---|
| 3,665,688 | 5/1972 | Sheehan et al. | 56/DIG. 9 |
| 4,249,365 | 2/1981 | Hubbard et al. | 56/13.2 |
| 4,722,173 | 2/1988 | Covington et al. | 56/15.9 |
| 4,742,671 | 5/1988 | Bich | 56/15.6 |
| 4,803,830 | 2/1989 | Junge et al. | 56/28 |
| 4,817,370 | 4/1989 | Deutsch et al. | 56/41 |

FOREIGN PATENT DOCUMENTS

231942 7/1969 U.S.S.R. .

Primary Examiner—Ramon S. Britts
Assistant Examiner—Terry L. Melius
Attorney, Agent, or Firm—Dressler, Goldsmith, Shore, Sutker & Milnamow, Ltd.

[57] ABSTRACT

A system for mounting and supporting cotton harvesting units for vertical displacement on a forward end of a cotton harvester frame. The mounting and supporting system includes a parallelogram-type linkage assembly for connecting the harvesting units to the frame such that the harvesting units maintain a generally level attitude in either lowered or raised positions. The linkage assembly includes vertically spaced and generally parallel lift arms and tension arms. Each lift arm and tension arm is pivotally attached at its rear end to the frame and at its forward end to the harvesting units. A tilting mechanism connects the rear end of the tension arms to the frame and is operable to move the harvesting units about their pivot attachment to the lift arm to a tilted position and thereby facilitate an increase in ground clearance for the cotton harvester.

14 Claims, 6 Drawing Sheets

COTTON HARVESTER MOUNTING AND SUPPORTING SYSTEM WITH HIGH LIFT CAPACITY

FIELD OF THE INVENTION

This invention generally relates to a cotton harvester and, more particularly, to a system for individually mounting and supporting at least two harvesting units on a frame of a cotton harvester in a manner enhancing ground clearance for the cotton harvester.

BACKGROUND OF THE INVENTION

Cotton harvesters having two or more harvesting units supported at a forward end of a frame in a side-by-side relation are well-known in the art. Each harvesting unit typically includes rotary picker drums arranged in fore-and-aft relation relative to each other. Each picker drum includes columns of picker spindles radially extending therefrom.

A mounting and support system is provided for connecting the harvesting units to the frame in a manner permitting vertical displacement of the harvesting units between lowered and raised positions. A typical mounting and supporting system includes two elongated tool bar structures extending laterally across the front end of the harvester. One tool bar structure has one or more harvesting units commonly thereon. The remaining harvesting units are commonly mounted on the other tool bar structure. Each tool bar structure is pivotally connected to the frame of the harvester by independently operated lift assemblies.

To facilitate narrow row cotton harvesting (30" row spacing) the picker drums of adjacent harvesting units are preferably nested relative to each other. The nested relationship and close proximity of the harvesting units relative to each other presents interference problems when the harvesting units are independently moved to their raised position.

U.S. Pat. No. 4,722,173 to M. J. Covington et al. provides a lift assembly which advantageously avoids interference problems between adjacent picker drums while permitting their vertical displacement relative to each other. The lift assembly disclosed in the Covington et al. patent vertically moves the harvesting units in substantially parallel relation relative to each other. The ability to move the harvesting units in parallel relation relative to each other furthermore maintains a substantially level attitude for the picker drums of the harvesting units relative to the ground surface over which the harvester moves during operation.

Cotton grows close to the ground on cotton plants. To maximize picking capacity, therefore, each harvesting unit is basically parallel to the ground and typically tilted in a fore-and-aft direction such that a forward end of the harvesting unit is arranged closer to the ground than is the rearward or aft end of the harvesting unit.

When the cotton harvester is driven from one portion or section of a field to another section of the field, the harvesting units are elevated into a raised position. Because the lift assembly is arranged beneath the cab region on the frame of the harvester, the vertical displacement of the harvesting units is limited. Thus, even after the harvesting units are moved into their raised position, the harvesting units remain parallel and close to the ground and define limited ground clearance for the cotton harvester. As will be appreciated, an ability to increase ground clearance reduces the likelihood of damage to the harvesting units as the harvester is transported and enhances harvester mobility.

SUMMARY OF THE INVENTION

In line with the above, and in accordance with the present invention, there is provided a system for mounting and supporting cotton harvesting units for vertical displacement on a forward end of a fore-and-aft extended frame of a cotton harvester. The mounting and supporting system includes a parallelogram-type linkage assembly for pivotally connecting one or more harvesting units to the frame for vertical movement between lowered and raised positions and in substantially parallel relation to each other. The system further includes a tilting mechanism for moving the harvesting units into a third or tilted position to improve ground clearance for the cotton harvester.

The mounting and supporting system includes a lift arm which is pivotally attached to and extends forwardly from the frame of the cotton harvester. At its forward end, the lift arm is pivotally connected to the harvesting units. In the preferred embodiment, a hydraulic cylinder is pivotally connected to the frame and lift arm for effecting angular displacement of the lift arm and, thereby, providing lift to the harvesting units.

The system of the present invention further includes a tension arm which is pivotally connected at its forward end to the harvesting units and at its rearward end to the frame of the harvester. The tension arm extends generally parallel to the lift arm and is of substantially equal length to the lift arm to maintain the harvesting units in a generally level attitude as they move between lowered and raised positions.

The tilting mechanism of the present invention is provided to move the harvesting units into a third or tilted position to enhance ground clearance and, thereby, enhance mobility for the cotton harvester. The harvesting units are moved into a tilted position by imparting an endwise component of movement to the tension arm relative to the lift arm. Endwise movement of the tension arm relative to the lift arm causes the harvesting units to pivot about their forward pivotal attachment to the lift arm and, thereby, move to a tilted position.

In a preferred embodiment, the harvesting units are commonly connected to an elongated tool bar structure which laterally extends across a forward end of the frame. The tool bar structure is pivotally attached to a forward end of the lift arm. Thus, when the lift arm is angularly displaced relative to the frame the tool bar with the harvesting units connected thereto is moved therewith. The pivotal attachment between the tool bar and lift arm allows the harvesting units to maintain a generally level attitude as they move between lowered and raised positions.

To facilitate increases in cotton harvesting productivity, some cotton harvesters include four or more harvesting units arranged in side-by-side relationship relative to each other. Two or more harvesting units are typically mounted on a first elongated tool bar structure while the remaining harvesting units are mounted on a second elongated tool bar structure. To facilitate independent vertical positioning of the harvesting units relative to the ground contour, separate mounting and supporting systems are provided for each tool bar structure.

The present invention is advantageous over prior systems in that the tilting mechanism of the present invention provides improved ground clearance for the cotton harvester by moving the harvesting units into a tilted position. The tilting mechanism preferably includes a rockshaft lever which, at one end, is pivotally connected to the frame. The opposite end of the rockshaft lever is pivotally connected to each of the mounting and supporting systems used to mount the harvesting units to the frame. During operation of the cotton harvester, the rockshaft lever is maintained in a substantially fixed position by a linearly distendable driver which is pivotally connected to the frame. The operative length of the driver controls the position of the rockshaft lever and, thereby, the fore-and-aft position or tilt of the harvesting units.

Activation of the tilting mechanism driver causes the rockshaft lever to move in a manner effecting endwise displacement of each tension arm relative to a respective lift arm. As mentioned above, endwise movement of the tension arm relative to the lift arm with the harvesting units connected thereto facilitates pivotal movement of the forward end of the harvesting units into a tilted position to improve ground clearance for the cotton harvester.

When two elongated tool bar structures are used to independently lift the harvesting units, separate drivers are preferably used for imparting lift to each tool bar structure. To inhibit interference problems between adjacent and relatively movable harvesting units mounted on the respective tool bars, the tilting mechanism of the present invention is configured to simultaneously move the harvesting units into a tilted position.

Numerous other features and advantages of the present invention will become readily apparent from the following detailed description, appended drawings, and accompanying claims.

BRIEF DESCRIPTION OF THE DRAWINGS

FIG. 5 is an enlarged fragmentary side elevational view of a tilting mechanism influencing the fore-and-aft disposition of a cotton harvesting unit.

DETAILED DESCRIPTION OF THE PRESENT INVENTION

While the present invention is susceptible of embodiment in various forms, there is shown in the drawings a presently preferred embodiment hereinafter described with the understanding that the present disclosure is to be considered as an exemplification of the invention and is not intended to limit the invention to the specific embodiment illustrated.

Figure 1:
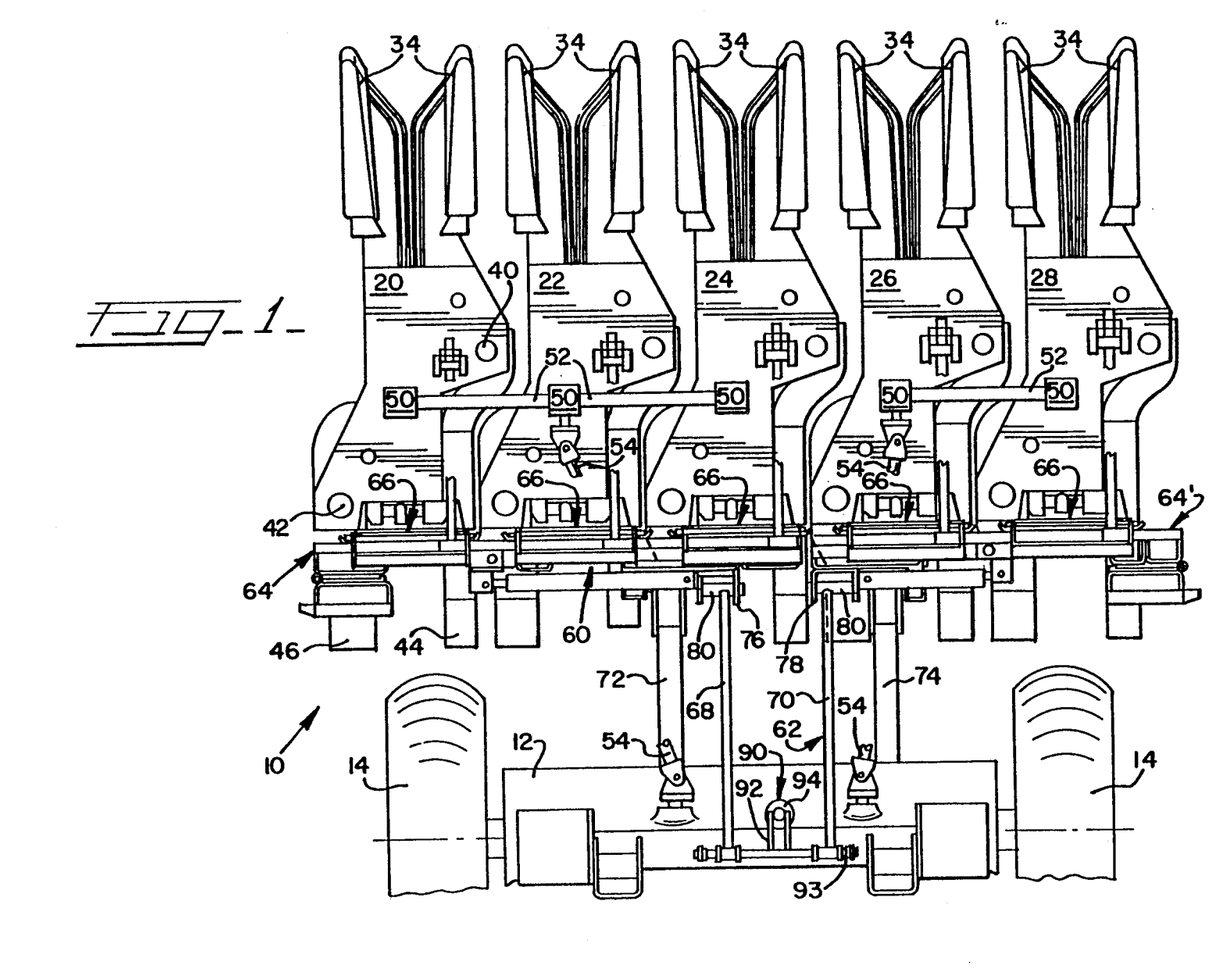
FIG. 1 is a partial top plan view of a cotton harvester illustrating a harvesting unit configuration for harvesting multiple narrow and adjacent rows of cotton.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame 12 mounted on a pair of ground engaging front wheels 14. A cab region 15 (FIG. 3) is provided at the forward end of the frame 12. A pair of steerable rear wheels (not shown) provide the harvester with proper direction.

Positioned forwardly on the frame are a plurality of individual cotton picker harvesting units 20, 22, 24, 26 and 28. As illustrated, the harvesting units are arranged in a side-by-side relationship for harvesting adjacent and generally parallel rows of cotton. It should be appreciated, however, that this invention equally applies to a lesser number of harvesting units than that illustrated.

In a preferred form of the invention, each of the harvesting units is substantially similar in structure. Accordingly, only a description of harvesting unit 20 will be provided with the understanding that the other harvesting units are similarly structured.

Figure 2:
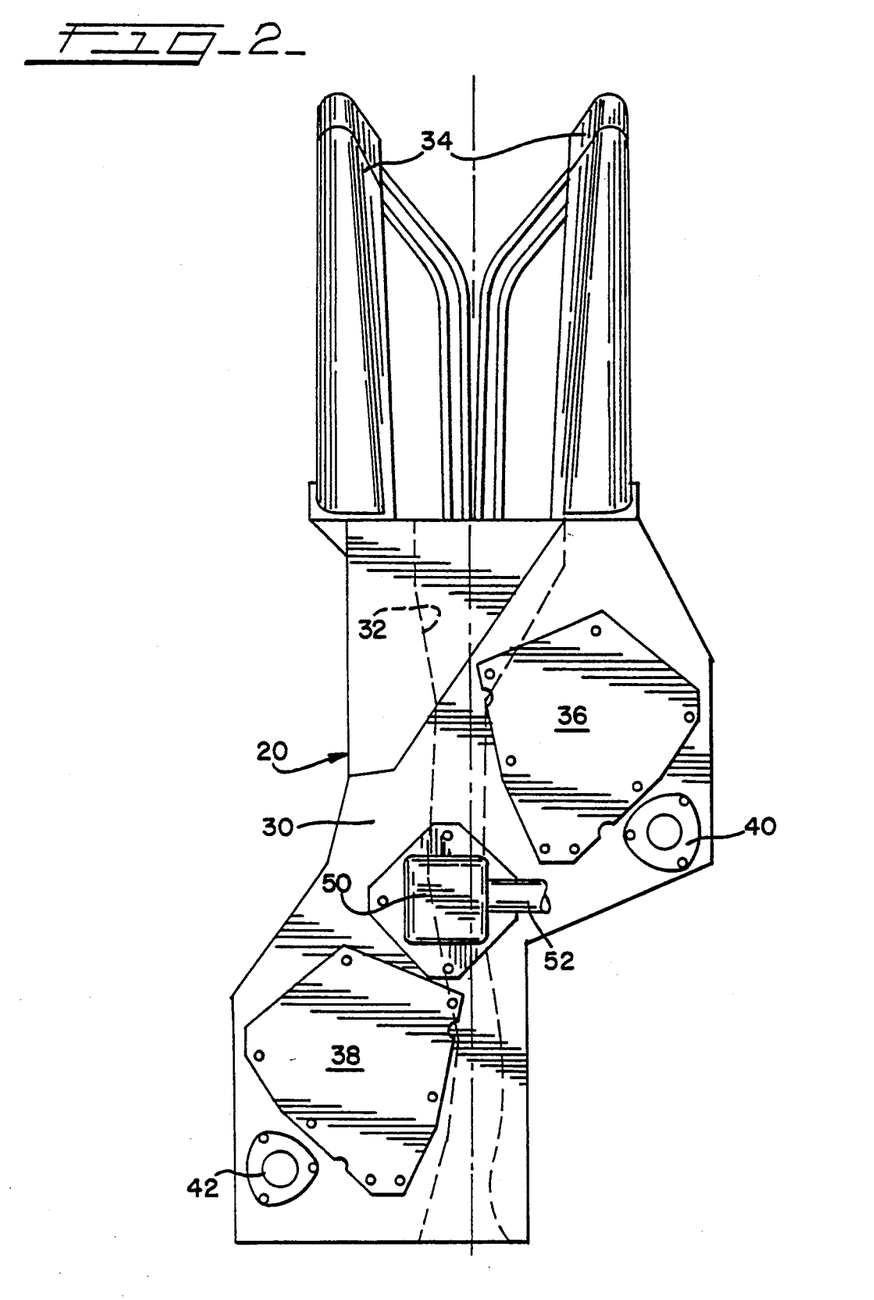
FIG. 2 is a top plan view showing the general configuration of a single harvesting unit.

Turning to FIG. 2, each harvesting unit includes a housing assemblies 30 defining a fore-and-aft crop-receiving opening or passage 32. Each harvesting unit is further provided with stalk lifters 34 on either side of opening 32 to guide the plant rows to the opening or passage 32.

As illustrated in FIG. 2, each harvesting unit further includes front and rear spindle rotors 36 and 38 which, in a preferred embodiment, are transversely separated by the fore-and-aft plant passage 32. Adjacent the spindle rotors 36 and 38 are conventional upright doffer assemblies 40 and 42, respectively, which remove cotton from the picking spindles on the spindle rotors 36 and 38. Conventional upright cotton discharge assemblies 44 and 46 (FIG. 1) are provided near the doffer assemblies 40 and 42, respectively. The discharge assemblies receive the cotton removed from the spindle rotors 36 and 38 by the doffer assemblies 40 and 42 and direct same through upright openings in the rear of the units. Cotton conveying ducts (not shown) direct the cotton from the discharge assemblies into a collecting receptacle (not shown).

As illustrated in FIG. 2, the spindle rotors 36 and 38 and the doffer assemblies 40 and 42 are driven by a conventional drive assembly. As illustrated, the drive assembly includes a beveled gear transmission mounted in a gear housing 50 preferably arranged at an upper end of each housing 30. Telescopic drive shafts 52 transmit torque and power from input shafts 54 to adjacent harvesting units and permit lateral displacement of the harvesting units with respect to each other without loss of power.

A mounting and supporting system, indicated generally by reference numeral 60 in FIG. 1, is provided for individually connecting each of the harvesting units to frame 12 of the cotton harvester for vertical movement between lowered and raised positions. The mounting and supporting system 60 of the present invention includes a lift assembly 62 and an elongated tool bar structure 64 connected to the lift assembly.

The harvesting units 20 through 28 are individually connected and commonly carried by the tool bar structure 64. As illustrated in FIG. 1, harvesting units 20 and 28 define an outboard pair of harvesting units which are movable along the length of tool bar structure 64 to adjust for various row widths and to open up space between adjacent harvesting units to facilitate servicing thereof. Harvesting units 22 and 26 define an inboard pair of harvesting units which are movable to adjust for various row widths and to open up space between adjacent harvesting units to facilitate servicing thereof. As illustrated, harvesting unit 24 is fixedly secured between harvesting units 22 and 26.

Figure 3:
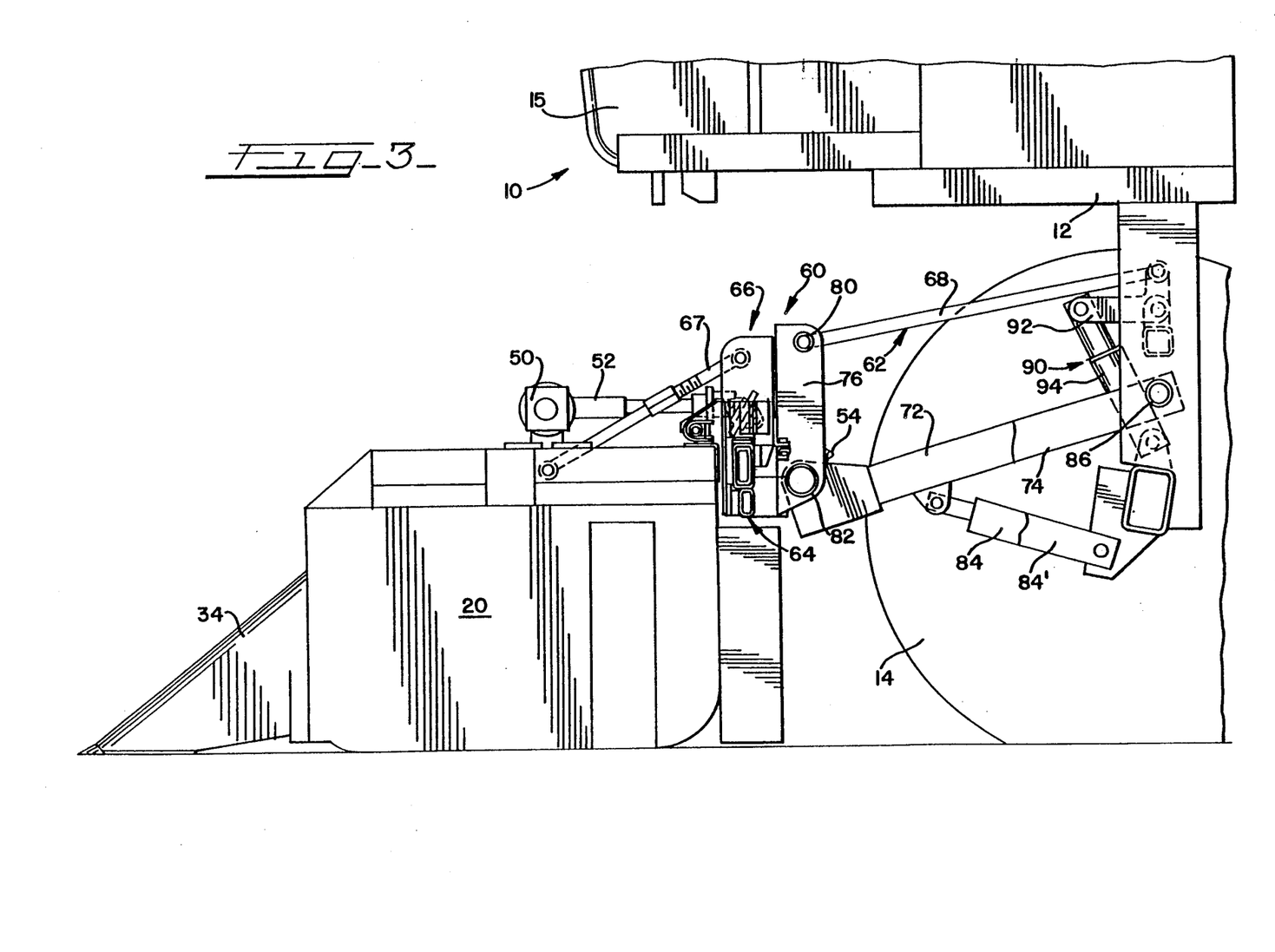
FIG. 3 is a partial side elevational view of the cotton harvest illustrated in FIG. 1.

Turning to FIG. 3, each harvesting unit is independently connected to the tool bar structure by a slide support structure 66 which includes a tension arm 67. The effective length of arm 67 normally regulates the fore-and-aft disposition of the harvesting unit relative to the ground surface over which the harvester moves. Each slide support structure 66 is connected to a rearward end of an associated harvesting unit to enhance visibility of the harvesting units from the cab region 15 of the harvester and permits the associated harvesting unit to slide along the length of the tool bar structure. For a more detailed description of the tool bar structure 64 and slide support structure 66, the reader's attention is invited to co-assigned Ser. No. 07/436,304, filed Nov. 13, 1989; the full teachings of which are incorporated herein by reference.

Lift assembly 62 operates as a parallelogram-type linkage which is pivotally connected to and extends forwardly from frame 12 of the cotton harvester. As illustrated in FIG. 1, lift assembly 62 includes a pair of laterally spaced upper tension arms 68, 70 which extend generally parallel to a pair of laterally spaced lower lift arms 72 and 74. The tension arms 68, 70 have an effective length which is approximately equal to that of the lift arms 72 and 74, respectively, and therefore the harvesting units connected thereto are maintained in a generally level attitude during field operation as they are moved between lowered and raised positions.

The tool bar structure 64 with the harvesting units 20 through 28 connected thereto, is connected to the forward ends of the tension arms 68, 70 and lift arms 72, 74. As illustrated, a pair of vertically disposed lever arms 76 and 78 are fixedly connected between the ends of the tool bar structure 64 and, thereby, to the harvesting units 20 through 28. A forward end of each tension arm 68, 70 is pivotally connected to an upper end of each lever arm 76, 78, respectively. A forward end of each lift arm 72, 74 is pivotally connected to a lower end of each lever arm 76, 78, respectively. As will be appreciated, the vertical disposition of the lever arms 76, 78 controls angular orientation of the tool bar structure 64 and, thereby, the fore-and-aft disposition or tilt of the harvesting units connected thereto.

Figure 4:
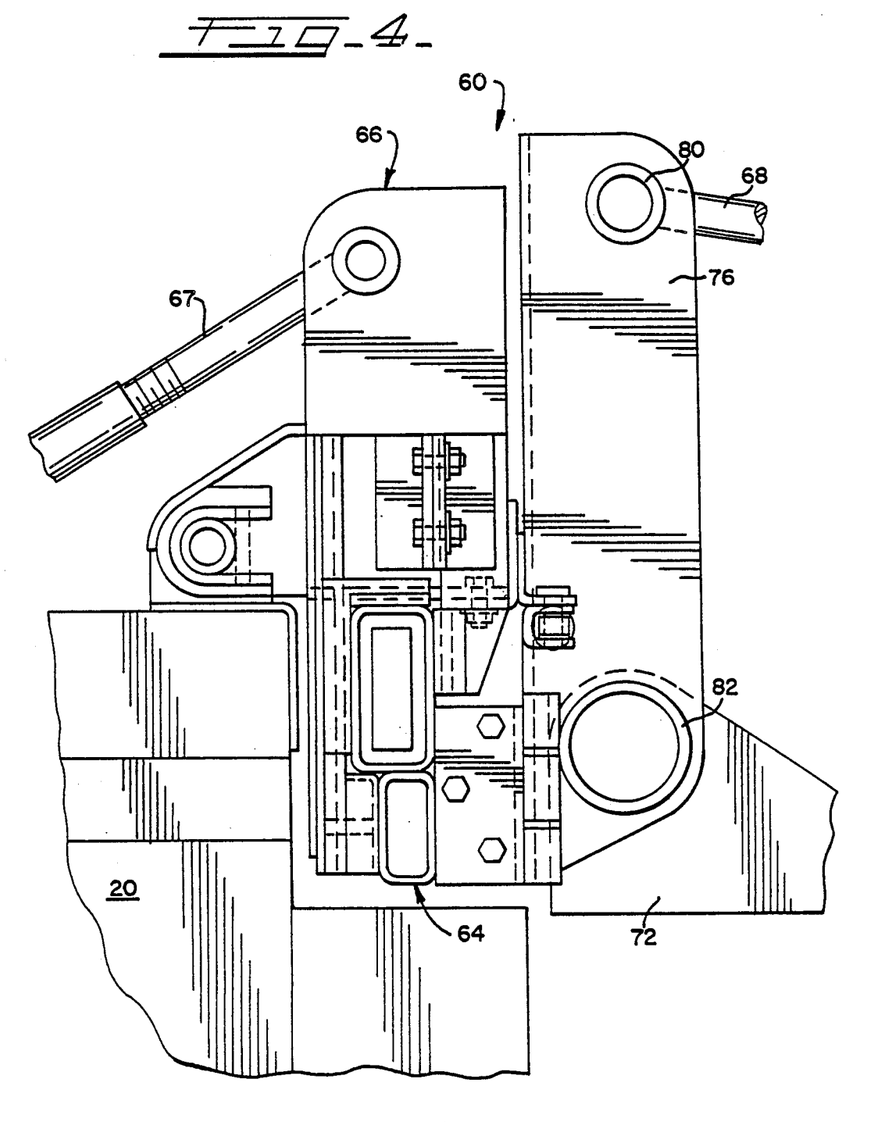
FIG. 4 is an enlarged fragmentary side elevational view of a mounting system as connected to a harvesting unit.

As seen in FIGS. 1, 3, and 4, stub shafts 80 pivotally connect the forward ends of tension arms 68 and 70 to an upper end of lever arms 76 and 78, respectively. Stub shafts 82 pivotally connect forward ends of lift arms 72 and 74 to a lower end of lever arms 76 and 78, respectively. The stub shafts 82 also define a horizontal axis about which the harvesting units 20 through 28 are pivotally connected to the frame 12.

As illustrated in FIG. 3, the lift assembly 62 further includes linearly distendable drivers 84, 84' for controlling the angular disposition of the lift arms 72 and 74 relative to the frame 12 and thereby adjusting the vertical position of the harvesting units 20 through 28 relative to the frame. Preferably, drivers 84, 84' are in the form of hydraulic cylinders. The cylinder end of each driver 84, 84' is pivotally connected to the frame 12. The rod end of driver 84 is pivotally connected between the ends of the lift arm 72. The rod end of driver 84' is pivotally connected between the ends of lift arm 74.

Figure 6:
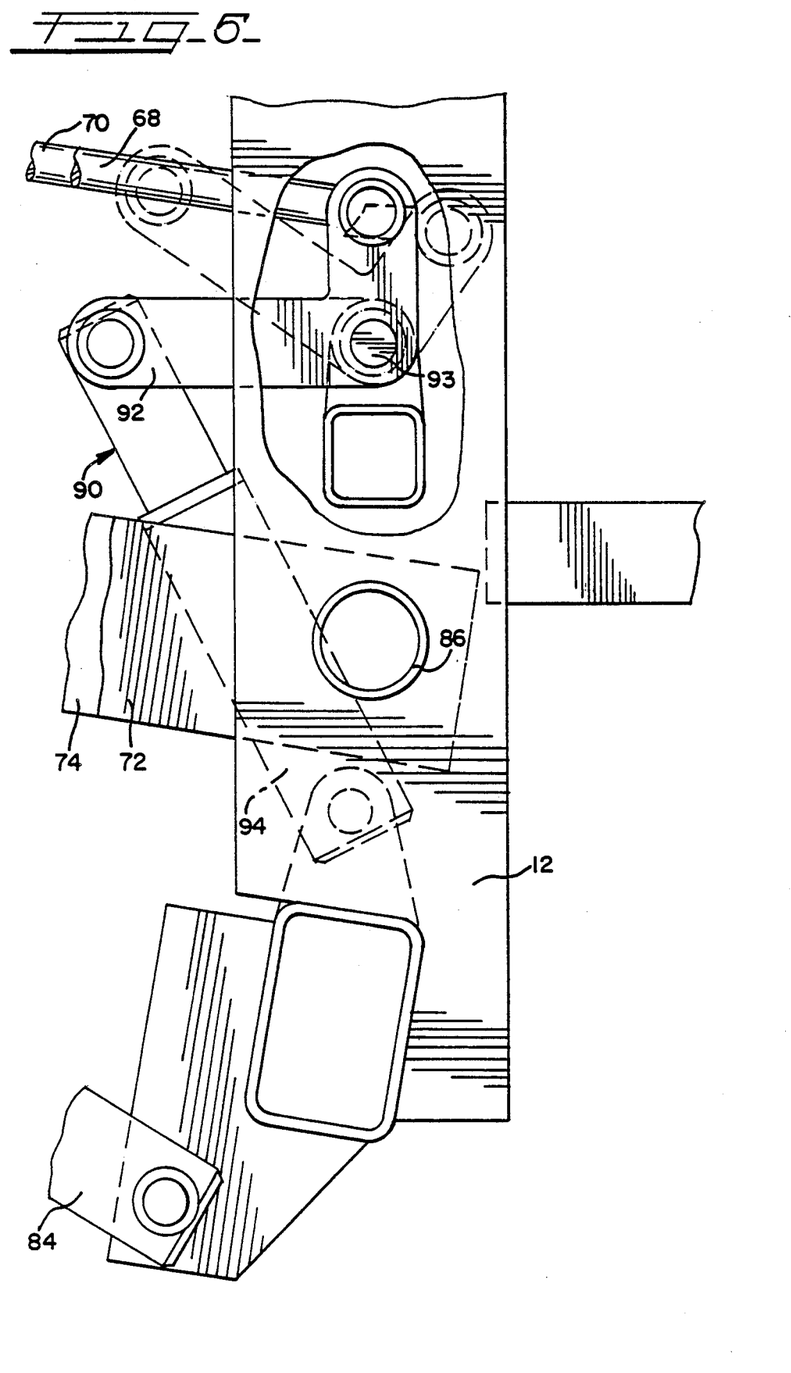
FIG. 6 is a schematic diagram of a control system associated with the tilting mechanism illustrated in FIG. 5.

As will hereinafter be described, fluid flow to and from each driver 84, 84' is controlled with valve assemblies 81, 81', respectively (FIG. 6). The valve assemblies 81 and 81' are connected to a pressurized source of fluid, such as oil, and include electrically operated solenoids 85, 87 and 85', 87', respectively, which regulate fluid flow therethrough.

To effect positive distention of driver 84 in a manner raising lift arm 72 and the harvesting units connected thereto, fluid flow to one end of driver 84 is controlled by electric solenoid 85 of valve assembly 81 (FIG. 6). To effect retraction of driver 84 in a manner lowering the lift arm 72 and the harvesting units connected thereto, fluid flow from driver 84 is controlled by electric solenoid 87 of valve assembly 81 (FIG. 6). Solenoids 85' and 87' of valve assembly 81' (FIG. 6) are similarly operated for controlling operation of driver 84' and thereby effecting the vertical disposition of lift arm 74 and the harvesting units connected thereto relative to the frame 12. Alternatively, double-acting hydraulic cylinders could be used to impart movement to the lift arms 72, 74.

Returning to FIG. 3, rearward ends of the tension arms 68, 70 and lift arms 72, 74 are pivotally attached to the frame 12. Stub shafts 86 are used to pivotally connect the rearward end of each lift arm 72, 74 to the frame 12.

Although a single tool bar structure 64 whose length is readily adjustable as by adding modular extensions thereto will serve to commonly support the harvesting units at the forward end of the cotton harvester, it may be desirable that a second tool bar structure 64' (FIG. 1) be used in conjunction therewith. It will be understood that the second tool bar structure 64' is substantially similar to the adjacent tool bar structure 64 and, thus, no further detailed description need be provided therefore at this time.

In those harvesting arrangements including three or more harvesting units, two or more harvesting units may be slidably accommodated on one tool bar structure, while the remaining harvesting units including stationary and/or movable units are mounted on the other tool bar structure.

As illustrated in FIG. 1, in those arrangements wherein independent tool bar structures are provided to mount the harvesting units, it is advantageous to allow for independent vertical movement of each tool bar structure 64 and 64'. To effect such ends, each tool bar structure has its own lift assembly connected thereto. Tension arm 68, lift arm 72 and lever arm 76 define a first lift assembly having a driver 84 associated therewith for adjusting the vertical disposition of tool bar structure 64 and the harvesting units connected thereto. Similarly, tension arm 70, lift arm 74 and lever arm 78 define a second lift assembly having driver 84' associated therewith for adjusting the vertical disposition of tool bar 64' and the harvesting units connected thereto. As will be appreciated, independent control of the drivers 84, 84' associated with the first and second lift assemblies will independently govern the vertical positions of the tool bar structures 64, 64' connected thereto and,. thereby, the vertical disposition of the harvesting units connected thereto.

A tilting mechanism 90 pivotally connects the rearward ends of both tension arms 68, 70 to the frame 12 about a common axis to provide for parallel vertical movement of the harvesting units relative to each other. As will be subsequently described, mechanism 90 is provided to simultaneously move the harvesting units to a tilted position to enhance ground clearance and improve harvester mobility.

As illustrated in FIGS. 1 and 5, mechanism 90 includes a rockshaft lever 92 which is movably connected to the frame 12 and a linearly distendable driver 94 which is selectively operated to positively position the lever 92 during operation of the harvester. As illustrated, the rockshaft lever 92 is pivotally connected to the frame 12 about a stub shaft 93 and has one end pivotally connected to the tension arms 68, 70 about a common axis. The other end of rockshaft lever 92 is connected to driver 94. As may be appreciated, other forms of mechanical linkage, other than rockshaft lever 92, could be used for imparting an endwise component of movement to the tension arms 68, 70 without detracting from the spirit and scope of the present invention.

Driver 94 positively positions the common axis for tension arms 68, 70 relative to the lift arms 72, 74. Preferably, driver 94 is a hydraulic cylinder. The cylinder end of driver 94 is pivotally connected to the frame 12. The rod or operative end of the cylinder 94 is pivotally connected to the lever 92.

As will hereinafter be described, fluid flow to and from driver 94 is controlled with a valve assembly 91 (FIG. 6). The valve assembly 91 is connected to a pressurized source of fluid, such as oil, and includes solenoids 95 and 97 (FIG. 6) which regulate fluid flow therethrough.

To effect positive extension of driver 94 in a manner imparting an endwise component of movement to the tension arms 68, 70 in a first direction, fluid flow to one end of driver 94 is controlled by electric solenoid 95 of valve assembly 91 (FIG. 6). To effect retraction of driver 94 in a manner imparting an endwise component of movement to the tension arms 68, 70 in a second direction, fluid flow from one end of driver 94 is controlled by electric solenoid 97 of valve assembly 91 (FIG. 6). Alternatively, driver 94 could be a double-acting hydraulic cylinder.

As mentioned above, the purpose of mechanism 90 is to simultaneously move the harvesting units into a tilted position to enhance ground clearance for the harvester. Moreover, the tilting mechanism 90 is advantageously configured to inhibit tilting of the harvesting units relative to each other, thereby reducing interference problems during vertical movement of the harvesting units.

FIG. 6 is a schematic diagram of a control system 100 for operating the first and second drivers or hydraulic cylinders 84, 84' used to raise and lower the first and second tool bar structures 64, 64', respectively. In the preferred embodiment, the control system 100 synchronizes the operation of drivers 84, 84' with the operation of the driver 94 for moving the harvesting units to and from a tilted position.

In a preferred form, the control system 100 is operative to preclude tilting of the harvesting units until and unless both tool bar structures 64, 64' are moved into a fully raised position to avoid interference problems between adjacent harvesting units as they are moved into a tilted position. Notably, however, with the housing assembly 30 of the harvesting units being designed as illustrated, it is necessary to only sense when tool bar structure 64 is level with or higher than tool bar structure 64' to effect tilting of the harvesting units without interference between adjacent and relatively movable harvesting units. An opposite design of the housing assembly on each harvesting unit would require that tool bar structure 64' be level with or higher than tool bar structure 64 to avoid interference between adjacent and relative movable harvesting units when moved to a tilted position. Therefore, and although the following description of the control system will set forth a preferred operation of moving the harvesting units to a fully raised position before moving to a tilted position, it should be appreciated that alternative predetermined positions of the tool bar structures could likewise be used without departing from the scope of the present invention.

As illustrated in FIG. 6, the control system includes a manually operated master control switch 102 preferably arranged in the cab region 15 of the harvester. Master control switch 10 selectively controls movement of the harvesting units between their lowered and raised positions by controlling operation of the solenoids 85, 87 and 85', 87' associated with the drivers 84 and 84', respectively. Furthermore, master control switch 102 selectively controls moVement of the harvesting units between their raised and tilted positions by controlling operation of the solenoids 95, 97 associated with driver 94. As illustrated, control system 100 further includes individual control switches 104 and 106 which are preferably arranged in the cab region 15 of the harvester. As described hereinafter, control switch 104 individually or independently controls operation of solenoids 85, 87, while control switch 106 individually controls operation of solenoids 85', 87'.

The master control switch 102 is shown as a two-pole, double throw switch with a neutral or off-position, and has movable contacts 110 and 112 which are illustrated in the neutral or normally open position. The movable contacts 110 and 112 are connected to a voltage source 114 such as a battery. Master control switch 102 also includes fixed raise contacts 116, 116' and fixed lower contacts 118, 118'. Lines 120, 122 electrically connect the fixed raise contact 116 to solenoid 85 associated with driver 84. Lines 120', 122' and 124' electrically join the fixed raise contact 116' to solenoid 85' associated with driver 84'.

The control system further includes position sensors 130, 130' which are operably associated with drivers 84, 84', respectively. In the preferred embodiment, sensors 130, 130' are in the form of proximity switches which close when the respective harvesting units connected to the drivers 84, 84' are moved into their fully raised position. In a most preferred form, the sensors 130, 130' are associated with the drivers 84, 84', respectively, to monitor when the drivers reach their fully extended position.

The position sensors 130, 130' are connected in series with a tilt control relay 132 over lines 134, 134'. The tilt control relay 132 operates in response to signals from the position sensors 130, 130' and includes a movable contact 136 and a normally open contact 138. The movable contact 136 of the tilt control relay 132 is electrically connected, over lines 120', 122', to the fixed raise contact 116' of master control switch 102. The normally open contact 138 of the tilt control relay 132 is electrically connected, over line 141, to solenoid 95 associated with driver 94 used to move the harvesting units from a raised position to a tilted position.

The control switches 104 and 106 permit the harvesting units connected to tool bar structure 64 to be moved between lowered and raised positions independently of the harvesting units connected to tool bar structure 64'.

Control switch 104 is illustrated as a single-pole switch with a neutral or off-position and includes a movable contact 140 which is illustrated in a neutral or normally open position. Control switch 104 further includes a fixed raise contact 142 and a fixed lower contact 144. The fixed raise contact 142 of switch 104 is electrically connected to solenoid 85 of driver 84 over line 122.

Control switch 106 is illustrated as a single-pole switch with a neutral or off-position and includes a movable contact 140' which is illustrated in a neutral or normally open position. Control switch 106 further includes a fixed raise contact 142' and a fixed lower contact 144'. The fixed raise contact 142' of switch 106 is connected to solenoid 85' of driver 84' over lines 122' and 124'.

Because of the close proximity of the harvesting units to each other, independent movement of the tool bar structures 64, 64' will cause interference between adjacent and relatively movable harvesting units when the units are in a tilted position. Therefore, a tilt position sensor 146 has been included within the control system 100 to inhibit independent movement of the harvesting units when in a tilted position under the influence of control switches 104 and 106.

As illustrated, the control system 100 of the present invention further includes a tilt sensing control relay 148 having a movable contact 150 and a normally open contact 152. The tilt sensing control relay 148 operates in response to signals from the tilt position sensor 146 which is, preferably, in the form of a proximity switch. In a preferred embodiment, the tilt position sensor 146 is operably associated with driver 94 and closes only when the driver 94 is fully retracted and the harvesting units are not in a tilted position. The movable contacts 140, 140' of the control switches 104, 106, respectively, are electrically connected together by a line 151 and to the voltage source 114, over a line 156, through the movable contact 150 and normally open contact 152 of the tilt sensing control relay 148.

A pair of lower control relays 158 and 158' are connected in series with the tilt sensing control relay 148 over a line 159. Lower control relay 158 includes a movable contact 160, a normally closed contact 162 and a normally open contact 164. The movable contact 160 is electrically connected over lines 165 and 167 to the fixed lower contact 118' of master control switch 102 and to the fixed lower contact 144 of control switch 104, respectively. Line 166 serves to electrically connect the normally closed contact 162 of relay 158 to the solenoid 97 of driver 94 used to move the harvesting units from a tilted position to a raised position. The normally open contact 164 of relay 158 is electrically connected, over line 168, to solenoid 87 of driver 84 used to move the harvesting units whose position is influenced by operation of driver 84 from a raised position to a lowered position.

Lower control relay 158' includes a movable contact 160', a normally closed contact 162' and a normally open contact 164'. The movable contact 160' of control relay 158' is electrically connected over lines 165' and 167' to the fixed lower contact 118 of master control switch 102 and to the fixed lower contact 144' of switch 106. The normally closed contact 162' of relay 158' is electrically connected to the normally closed contact 162 of relay 158 over line 170. The normally open contact 164' of relay 158' is electrically connected, over line 172, to solenoid 87' of driver 84' used to move the harvesting units whose position is influenced by operation of driver 84' from a raised position to a lowered position.

During operation of the harvester, the drivers 84, 84' are operated to allow the lift arms 72, 74 to position the harvesting units in a first or lowered position. As will be appreciated, the ultimate vertical position of the harvesting units is controlled by adjusting the operative or effective length of each driver 84, 84'.

As will be understood, during operation of the harvesting units in their lowered position, the rockshaft lever 92 of the harvesting unit tilting mechanism 90 is held in a fixed position by the driver 94 throughout the extended stroke of the drivers 84, 84' of the lift assemblies. Maintaining the rockshaft lever 92 in a fixed position likewise maintains the tension arm 68, 70 in a fixed position relative to the lift arms 72, 74 throughout movement of the lift arms. When the harvesting units are in their lowered position, mechanism 90 preferably positions the rearward pivot for the tension arm 68, 70 in vertically spaced and generally aligned relationship with the stub shafts 86 such that the tension arms 72, 74 extend generally parallel to a line drawn through the centers of the pivot shafts 86 and the pivot shafts 82 arranged at the forward end of each lift arm 72, 74.

To facilitate positioning of the harvesting units relative to the ground contour over which the harvester moves, the first lift assembly, comprised of tension arm 68, lift arm 72, lever arm 76 and driver 84, operates independently of the second lift assembly comprised of tension arm 70, lift arm 74, lever arm 78 and driver 84'. Although commonly connected at their rearward ends, mechanism 90 allows the tension arms 68, 70 to independently pivot about the common axis provided by the rockshaft lever 92 such that the first and second lift assemblies are permitted to not only act independently of each other, but also maintain the harvesting units parallel with respect to each other throughout their range of movement.

As discussed above, when harvesting narrow row cotton, the harvesting units are arranged in close proximity relative to each other. To avoid interference between relatively movable adjacent harvesting units, the harvesting units are moved in parallel relation with each other between their lowered and raised positions. In this regard, mechanism 90 provides a twofold purpose. First, mechanism 90 maintains the first and second lift assemblies in a parallel link arrangement throughout the stroke of each driver 84, 84'. As such, the harvesting units connected to the respective lift arms assemblies are moved vertically in a parallel relation to each other. The second purpose of mechanism 90 is to provide added ground clearance for the cotton harvester by moving the harvesting units from a raised position into a tilted position.

To enhance mobility of the cotton harvester, harvesting units 20 through 28 are moved into a second or raised position during transport of the harvester. The harvesting units are moved into the raised position by linearly distending the drivers 84, 84' which causes the lift arms 72, 74 to move the tool bar structures 64, 64' into raised positions. Because the harvesting units 20 through 28 are individually connected to the tool bar structure 64, 64', they too are vertically moved into a raised position.

To simultaneously raise both tool bar structures 64, 64' from their lowered position to a raised position, the master control switch 102 is operated such that the movable contacts 110 and 112 thereof engage the fixed raise contacts 116 and 116', respectively. When the contacts 110 and 112 engage contacts 116 and 116', two circuits are simultaneously completed. One completed circuit includes the movable contact 110 and the fixed raise contact 116 which are electrically joined over lines 120 and 122 to energize solenoid 85 of valve assembly 81 and allow extension of driver 84 to move lift arm 72 and the harvesting units connected thereto into a raised position. The other completed circuit includes the movable contact 112 and the fixed raise contact 116' which are electrically joined over lines 120, 122' and 124' to energize solenoid 85' of valve assembly 81' and allow for extension of driver 84' in a manner moving lift arm 74 and the harvesting units connected thereto into a raised position.

A salient feature of the present invention being the ability to add a high lift characteristic to the cotton harvester by tilting the harvesting units after they have been moved into their raised position. The ability to impart high lift to the harvesting units is effected through operation of the tilting mechanism 90.

To inhibit interference problems between adjacent and relatively movable harvesting units, position sensors 130, 130' are included in the control system 100 to monitor the disposition of the tool bar structures 64, 64' relative to each other. In the preferred embodiment, each of the position sensors 130, 130' closes when the drivers 84, 84' associated therewith move the harvesting units to their fully raised position. The closure of both of the position sensors 130, 130' energizes the tilt control relay 132 to close the relay contacts 136, 138 and complete a circuit leading from the fixed raise contact 116' of the master control switch 102 to the solenoid 95 of valve assembly 91. Completion of the circuit to solenoid 95 permits fluid to flow to the driver 94 in a manner linearly extending same. As will be appreciated, neither the tilt control relay 132 nor the solenoid 95 for effecting linear extension of solenoid 94 can be energized until both drivers 84 and 84' are fully extended to close the position sensors ,130, 130'.

Turning to FIG. 5, linear extension of the driver 94 acts to endwise displace the tension links 68 and 70 relative to the lift arms 72, 74. In the illustrated embodiment, extension of the driver 94 will act on the lever 92 rocking it rearwardly. Movement of the rockshaft lever 92 from the solid line position illustrated in FIG. 5 to the dotted line position illustrated in FIG. 5 causes endwise displacement of the tension arms 68, 70 which are commonly connected thereto. Endwise displacement of the tension arms 68, 70 relative to the lift arms 72, 74, respectively, pivots the lever arms 76, 78 about the pivot shafts 82 (FIG. 3). As a result, the forward ends of the harvesting units are tilted upward in a simultaneous manner. The vertical displacement of the harvesting units into a tilted position provides added lift and ground clearance to the harvester.

Returning to FIG. 6, the control system 100 of the present invention further provides for individual movement of the tool bar structures 64, 64' and the harvesting units connected thereto between lowered and raised positions. The control switch 104 permits the harvesting units connected to tool bar structure 64 to be moved between lowered and raised positions independently of the harvesting units connected to tool bar structure 64'. As noted above, the fixed raise contact 142 of control switch 104 is electrically connected over line 122 to the solenoid 85 which, when energized, operates to linearly extend driver 84 in a manner raising the harvesting units thereto. The raise contact 142' of the control switch 106 is electrically connected, over lines 122' and 124', to the solenoid 85' which, when energized, operates to linearly extend driver 84' in a manner raising the harvesting units connected thereto.

As noted above, the movable contacts 140, 140' of the control switches 104, 106, respectively, are electrically connected together by line 151 and to the voltage source 114, over a line 156, through the movable contact 150 and the normally open contact 152 of the tilt sensing control relay 148. The tilt sensing control relay 148 is energized when the tilt sensor 146 is closed. As noted above, the tilt sensor 146 is closed when the driver 94 of the tilting mechanism 90 is retracted and the harvesting units are operable between their lowered and raised positions. Thus, the drivers 84, 84' can be operated under the influence of the control switches 104 and 106 only while the harvesting units are moved between their lowered and raised positions. Once the driver 94 of the tilting mechanism 90 is operated to move the harvesting units into a tilted position, the position sensor 146 signals the tilt sensing control relay 148 to open and thereby disconnect the individual control switches 104 and 106 from their source of power 114.

When the harvesting units are not in a tilted position, the position sensor 146 energizes the tilt sensing control relay 148. Energization of the tilt sensing control relay 148 likewise energizes each of the lower control relays 158, 158' to switch the movable contacts 160, 160', thereby opening the normally closed contacts 162, 162' and closing the normally open contacts 164, 164'. Closing the normally open contacts 164, 164' completes a circuit between each of the solenoids 87, 87' and the corresponding lower contacts 118, 118' of the master control switch 102 over lines 165 and 165' and to the lower contacts 144, 144' of the control switches 104 and 106. Thus, when the harvesting units are not in a tilted position, the lower control relays 158, 158' are energized to complete a circuit to the solenoids 87, 87' and permitting the tool bar structures 64, 64' to be lowered either by operation of the master control switch 102 or the individual control switches 104 and 106.

When the harvesting units are moved under the influence of the tilting mechanism into a tilted position, the position sensor 146 is opened in a manner de-energizing the tilt sensing control relay 148 and the lower control relays 158, 158'. De-energizing the control relays 158, 158' causes the movable contacts 160, 160' to switch and close the normally closed contacts 162, 162' and open the normally open contacts 164, 164'. The normally closed contacts 162, 162' of the lower control relays 158, 158', respectively, are each connected to the solenoid 97 over lines 166 and 170. With the harvesting units in a tilted position, however, the control switches 104 and 106 are disabled because the tilt control relay 148 is de-energized and the normally open contact 152 connected to the individual control switches 104, 106 is open, thereby disconnecting the switches 104, 106 from the voltage source 114. Therefore, only operation of the master control switch 102 will enable operation of the solenoid 97 to effect retraction of the driver 94 in a manner simultaneously moving the harvesting units from a tilted to a raised position.

From the above, it can be seen that when the harvesting units are moved from their raised to a tilted position, only the master control switch 102 is enabled. When the movable contacts 110, 112 of the master control switch 102 engage the lower fixed contacts 118, 118', the solenoid 97 is operated to permit retraction of the driver 94, and the solenoids 87 and 87' of the drivers 84 and 84' are disabled and cannot be energized.

Thus, the control system 100 as illustrated in FIG. 6 automatically sequences and synchronizes operation of the drivers 84, 84' with the tilting mechanism 90 of the present invention. Operation of the master control switch 102 will initially raise both of the tool bar structures 64, 64' with the harvesting units connected thereto. When the tool bar structures 64, 64' are fully raised, the driver 94 of the tilting mechanism 90 is energized to move the harvesting units from a raised position to a tilted position.

To move the harvesting units from a tilted position to a raised position, the master control switch 102 is actuated such that the movable contacts 110 and 112 of switch 102 are moved into engagement with the lower fixed contacts 118, 118'. When the contacts 110, 112 of the master control switch 102 engage the lower contacts 118, 118', the driver 94 of the tilting mechanism is controlled to allow movement of the harvesting units from a tilted position to a raised position. After the harvesting units reach their raised position, operation of the master control switch thereafter energizes the drivers 84, 84' to lower the tool bar structures 64, 64' and the harvesting units connected thereto to a lowered position.

The control switches 104, 106 are operative to raise and lower each of the drivers 84, 84' independently. Power is interrupted, however, to switches 104 and 106 when the harvesting units begin movement to a tilted position. Therefore, the control switches 104 and 106 are ineffective after the harvesting units begin their movement into a tilted position. Similarly, the harvesting units cannot be independently moved relative to each other under the influence of the control switches 104, 106 during the phase of their movement between the tilted position and a raised position. As will be understood, the control switches 104, 106 are effective only when the harvesting units are moved between lowered and raised positions.

When the harvesting units are returned from a tilted position to their raised position, the harvesting units assume generally the same level attitude as they were disposed prior to operation of the tilting mechanism 90. The ability to move the common axis for the tension arms 68, 70 in a fore-and-aft direction relative to the lift arms 70, 72 facilitates displacement of the harvesting units in a manner controlling their tilt relative to the ground surface and in a manner increasing ground clearance when required without adding substantially to the mechanisms of the harvester.

From the foregoing, it will be observed that numerous modifications and variations can be effected without departing from the true spirit and scope of the novel concept of the present invention. It will be appreciated that the present disclosure is intended to set forth an exemplification of the invention which is not intended to limit the invention to the specific embodiments illustrated. The disclosure is intended to cover by the appended claims all such modifications as fall within the scope of the claims.

We claim:

1. A system for mounting and supporting a harvesting unit on a fore-and-aft extending frame of a cotton harvester, said system allowing for vertical movement of said harvesting unit relative to said frame, said system comprising:

a lift arm pivotally attached at a rear end to said frame and at a forward end to said harvesting unit;

means for effecting angular displacement of said lift arm and thereby vertical displacement of the harvesting unit connected thereto between lowered and raised positions;

a tension arm pivotally connected at a rear end to said frame and at a forward end to said harvesting unit, said tension arm extending substantially parallel to said lift arm such that said harvesting unit maintains a generally level attitude in its lowered and raised positions; and harvesting unit tilting means for pivoting the harvesting unit about its pivotal attachment to said lift arm from said raised position to a tilted position to facilitate an increase in ground clearance for the harvesting unit, said harvesting unit tilting means including a lever pivotally connected between said frame and the rear end of said tension arm and a linearly distendable driver connected to the fame for pivotally moving said lever, wherein the operative length of said driver controls the tilted position of said harvesting unit.

2. The system for mounting and supporting a harvesting unit according to claim 1 wherein said means for effecting angular displacement of said lift arm comprises a linearly distendable driver, one end of said driver being connected to said lift arm and an opposite end of said driver being connected to said frame.

3. The system for mounting and supporting a harvesting unit according to claim 1 wherein said tension arm and said lift arm are of substantially equal length.

4. A system for mounting and supporting at least two harvesting units in side-by-side relation on a fore-and-aft extending frame of a cotton harvester for vertical movement relative to the frame, said system comprising:

a laterally elongated tool bar structure commonly connected to said harvesting units; and lift assembly means pivotally connected to and extending forwardly from said frame for supporting said elongated tool bar structure and the harvesting units connected thereto for vertical movement relative to the frame between lowered and raised positions, said lift assembly means comprising a pair of upper arms, a pair of lower arms, and first drive means connected to at least one of said lower arms and to said frame, with upper and lower arms of each pair extending generally parallel to each other and pivotally connected at opposite ends to said frame and to said tool bar structure, said pairs of arms maintaining said harvesting units in a generally level attitude as said harvesting units move between their lowered and raised position; and harvesting unit tilting means carried on said frame and including second drive means for endwise displacing one pair of arms relative to the other pair of arms to effect pivotal movement of said tool bar structure thereby tilting the harvesting units connected thereto into a tilted position to facilitate an increase in ground clearance for the cotton harvester.

5. The system for mounting and supporting at least two harvesting units according to claim 4 wherein said harvesting unit tilting means includes a lever pivotally attached to said frame and to a rearward end of each of said upper pair of arms.

6. The system for mounting and supporting at least two harvesting units according to claim 4 wherein said harvesting unit tilting means further includes means for controlling endwise displacement of said one pair of arms relative to the other pair of arms in response to movement of said first drive means into a predetermined position.

7. A system for mounting and supporting at least two fore-and-aft extending cotton harvesting units to a frame of a cotton harvester for movement over a field, said system being capable of vertically positioning the harvesting units relative to the frame, said system comprising:
  a pair of laterally spaced lift arms pivotally attached at a rearward connection to and extending forwardly from said frame, a free end of each lift arm being pivotally connected at a forward connection to at least one of said at least two harvesting units;
  first drive means for effecting independent angular displacement of said lift arms relative to said frame in a manner independently positioning said harvesting units between lowered and raised positions;
  a pair of laterally spaced tension arms extending above and generally parallel to the lift arms for maintaining said harvesting units in a generally level attitude as they move between raised and lowered positions, each tension arm being pivotally connected at a rearward connection to said frame and pivotally connected at a forward connection to a respective one of said harvesting units; and
  harvesting unit tilting means for providing a common rearward connection about which both of said tension arms are pivotally attached to said frame, said harvesting unit tilting means including second drive means operable to displace in a fore-and-aft direction the common rearward connection for said tension arms and thereby move said harvesting units connected thereto into a tilted position.

8. The system for mounting and supporting at least two cotton harvester units according to claim 7 wherein said first drive means includes two linearly distendable drivers, one driver being pivotally attached to each of said lift arms and said frame.

9. The system for mounting for supporting at least two cotton harvester units according to claim 7 wherein said harvesting unit tilting means includes a lever which is pivotally connected to said frame and which defines the common rearward connection about which both of said tension arms are pivotally attached to said frame.

10. The system for mounting and supporting at least two cotton harvester units according to claim 8 wherein said said second drive means of said harvesting unit tilting means includes a linearly distendable driver for simultaneously moving all of the harvesting units to their tilted position in response to all the harvesting units being moved into raised positions.

11. A system for mounting and supporting at least two fore-and-aft extending cotton harvesting units to a frame of a cotton harvester for movement over a field, said system being capable of vertically positioning the harvesting units relative to the frame, said system comprising:
  a pair of laterally spaced lift arms pivotally attached to and extending forwardly from said frame, a free end of each lift arm being pivotally connected to at least one of said at least two harvesting units;
  two linearly distendable drivers for effecting independent angular displacement of said lift arms a relative to said frame in a manner positioning said harvesting units between lowered and raised positions, wherein one driver is pivotally attached to each of said lift arms and said frame;
  a pair of laterally spaced tension arms extending above and generally parallel to the lift arms, each tension arm being pivotally connected at its ends to a respective one of said harvesting units and to said frame; and
  harvesting unit tilting means for pivotally attaching both of said tension arms to said frame about a common axis, said harvesting unit tilting means including a linearly distendable driver for simultaneously moving all the harvesting units to their tilted position and electronic circuitry for controlling operation of the harvesting unit tilting means driver in response to movement of all the harvesting units being moved into a predetermined position by said angular displacement means drivers.

12. The system for mounting and supporting at least two harvesting units according to claim 11 wherein each of said linearly distendable drivers is a hydraulic cylinder.

13. A system for mounting and supporting a harvesting unit on a frame of a cotton harvester, said system allowing for vertical displacement of said harvesting unit relative to said frame, said system comprising:
  a lift assembly connecting said harvesting unit to said frame and allowing for vertical movement of said harvesting unit in a generally level attitude between lowered and raised positions, said lift assembly including a lift arm pivotally attached at a forward end to the harvesting unit and at a rearward end to said frame, and means for effecting angular displacement of said lift arm relative to said frame so as to move said harvesting unit between its lowered and raised positions; and
  means pivotally connected to said harvesting unit and to said frame for pivoting the harvesting unit from its raised position and about its pivotal attachment to said lift arms, said means for pivoting the harvesting unit including a tension arm pivotally connected at one end to said harvesting unit and extending generally parallel to said lift arm and a tilting mechanism including lever means for pivotally connecting an opposite end of said tension arm to said frame to allow for endwise movement of said tension arm under the influence of a linearly distendable driver operable in combination with said lever and tension arm for moving said harvesting unit from its raised position to facilitate tilting of the harvesting unit.

14. A system for mounting and supporting at least one harvesting unit on a foreandaft extending frame of a cotton harvester, said system allowing for vertical movement of said harvesting unit relative to said frame, said system comprising:
  lift assembly means pivotally connected to and forwardly extending from said frame for connecting said harvesting unit to said frame for movement along a vertical path of travel between lowered and raised positions, said lift assembly means including a pair of upper and lower arms vertically spaced from and extending generally parallel to each other, each of said arms being pivotally connected at their forward ends to said lever arm and at their rearward ends to said frame, said arms maintaining said harvesting unit in a generally level attitude as said harvesting unit is vertically moved in response to operation of first drive means; and harvesting unit tilting means including second drive means operable independent of said first drive mean for pivoting said harvesting unit relative to said vertical path of travel and to a tilted position to facilitate an increase in ground clearance for said harvester.

* * * * *

UNITED STATES PATENT AND TRADEMARK OFFICE
CERTIFICATE OF CORRECTION

PATENT NO. : 4,993,216

DATED : February 19, 1991

INVENTOR(S) : Michael J. Covington; G. Neil Thedford; Jesse H. Orsborn; and John F. Link It is certified that error appears in the above-identified patent and that said Letters Patent is hereby corrected as shown below:

Title page, item [75] line 3, before "all of ILL." insert
--John F. Link, Calumet City,--;

Column 8, line 20, "moVement" should be --movement--.

Signed and Sealed this

Thirteenth Day of October, 1992

*Attest:*

DOUGLAS B. COMER

*Attesting Officer*      *Acting Commissioner of Patents and Trademarks*